United States Patent [19]
Hashimoto et al.

[11] Patent Number: 5,719,968
[45] Date of Patent: Feb. 17, 1998

[54] DIGITAL COPY MACHINE THAT CARRIES OUT OPTIMUM COPY REGARDLESS OF ORIGINAL MOUNTED POSITION

[75] Inventors: Hideyuki Hashimoto, Toyokawa; Kaoru Tada, Aichi-Ken, both of Japan

[73] Assignee: Minolta Co., Ltd., Osaka, Japan

[21] Appl. No.: 358,769

[22] Filed: Dec. 19, 1994

[30] Foreign Application Priority Data

Mar. 4, 1994 [JP] Japan .................. 6-034665

[51] Int. Cl.⁶ .................. H04N 1/40; H04N 1/04
[52] U.S. Cl. .................. 382/288; 382/289; 358/449; 358/488; 399/86
[58] Field of Search .................. 358/449, 452, 358/451, 488, 401; 355/55; 399/86, 17, 379; 382/289, 288

[56] References Cited

U.S. PATENT DOCUMENTS

| | | | |
|---|---|---|---|
| 4,763,200 | 8/1988 | Nakatani et al. | 358/449 |
| 4,875,104 | 10/1989 | Kamon | 358/400 |
| 4,907,095 | 3/1990 | Komura et al. | 358/451 |
| 4,922,350 | 5/1990 | Rombola et al. | 358/488 |
| 4,984,020 | 1/1991 | Adachi et al. | 399/184 |
| 4,992,887 | 2/1991 | Aragaki | 358/451 |
| 5,162,918 | 11/1992 | Muramatsu | 358/300 |
| 5,276,533 | 1/1994 | Shimizu et al. | 358/448 |
| 5,448,346 | 9/1995 | Tabata | 399/45 |

FOREIGN PATENT DOCUMENTS

| | | | |
|---|---|---|---|
| 62-1370 | 1/1987 | Japan | H04N 1/40 |
| 2-33263 | 2/1990 | Japan | H04N 1/40 |

*Primary Examiner*—Edward L. Coles, Sr.
*Assistant Examiner*—Tia M. Harris
*Attorney, Agent, or Firm*—Sidley & Austin

[57] ABSTRACT

An image of an original mounted on a platen is converted into image data by a CCD. An original region detection unit detects the region of the original mounted on the platen from the image data. According to this detection, the writing address of the image memory is controlled so that image data of the center of the original mounted region is written into an address matching the center of the sheet. As a result, various image editorial processes can easily be carried out in a digital copy machine.

21 Claims, 15 Drawing Sheets

DE-SELECT OUT-OF-ORIGINAL ERASURE MODE
SELECT FREE ORIGINAL PLACEMENT MODE

SELECT OUT-OF-ORIGINAL ERASURE MODE
SELECT FREE ORIGINAL PLACEMENT MODE

DE-SELECT OUT-OF-ORIGINAL ERASURE MODE
DE-SELECT FREE ORIGINAL PLACEMENT MODE

SELECT OUT-OF-ORIGINAL ERASURE MODE
DE-SELECT FREE ORIGINAL PLACEMENT MODE

DIGITAL COPY MACHINE THAT CARRIES OUT OPTIMUM COPY REGARDLESS OF ORIGINAL MOUNTED POSITION

BACKGROUND OF THE INVENTION

1. Field of the Invention

The present invention relates to digital copy machines, and more particularly, to a digital copy machine that can carry out an optimum copy regardless of the mounted position of an original sheet (hereinafter referred to as the "original").

2. Description of the Related Art

A digital copy machine is known that reads the image of an original mounted on a platen by a reader such as a CCD to create image data for each pixel which is subjected to an image process, and providing the same on a sheet by an image forming unit. A digital copy machine can detect the mounted position and image region of an original according to the image data.

For example, in U.S. Pat. No. 4,763,200, an image reading apparatus is disclosed that has an original mountable on an arbitrary position on the platen by determining an original image region and printing out only image data of the original image region.

Japanese Patent Laying-Open Nos. 62-1370 and 2-33263 disclose the technique of erasing an image outside the original region.

U.S. Pat. No. 5,162,918 discloses displaying a readout image on a monitor and applying out-of-region erasure, automatic paper selection (APS) or automatic magnification selection (AMS) on the region specified on that monitor.

According to the devices described in U.S. Pat. No. 4,763,200, and Japanese Pat. Laying-Open Nos. 62-1370 and 2-33263, no particular relationship is shown between the position of the original and the position of the sheet on which the original is reproduced although the original can be mounted on an arbitrary position on the platen. Only image formation of image data on a sheet of an appropriate size according to the detected image region (original region) is shown. Because copying magnification is not taken into account in these devices, there is a possibility of a portion of the image being missing when the image is magnified or reduced. In these devices, the original had to be placed at a predetermined position when copy must be obtained with magnification/reduction.

The copy machine disclosed in U.S. Pat. No. 5,162,918 allows various editorial processes. However, the operation was complicated and time consuming since the editorial process can be carried out only after specifying a region with a dedicated menu.

SUMMARY OF THE INVENTION

In view of the foregoing, an object of the present invention is to provide a digital copy machine that can carry out optimum copying regardless of the original mounted position in copying an original at a desired magnification.

Another object of the present invention is to provide a digital copy machine that can easily carry out various editorial processes.

The above objects of the present invention are achieved by a digital copy machine including an image reader that reads out image data and provides corresponding image data to a memory, and an original region detection unit that detects an original region according to the output data.

According to the digital copy machine of the present invention, an image is formed at the center of a sheet according to a specified copy magnification so that the center of a region detected by the original region detection unit is copied on the center of the sheet regardless of the copy magnification. Thus, a digital copy machine is provided that allows optimum copying regardless of the original mounted position in copying an original at a predetermined magnification.

Preferably, when an image is to be outputted to a memory, image data are written into the memory so that the address of the image data at the center of a region detected by the original region detection unit becomes the address corresponding to the center of the sheet in the memory.

The center of the original can be copied onto the center of the sheet regardless of the copy magnification by writing the image data of the center of the original into the address corresponding to the sheet center portion of the image memory.

More preferably, when the center of the original is to be copied onto the center of a sheet, it is desirable to prevent image other than the original region from being copied by erasing appropriate image data.

Because an image other than that of the original is not copied, a clear and readable copied representation can be obtained.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

The embodiments of the present invention will be described hereinafter with reference to the drawings.

Figure 1:
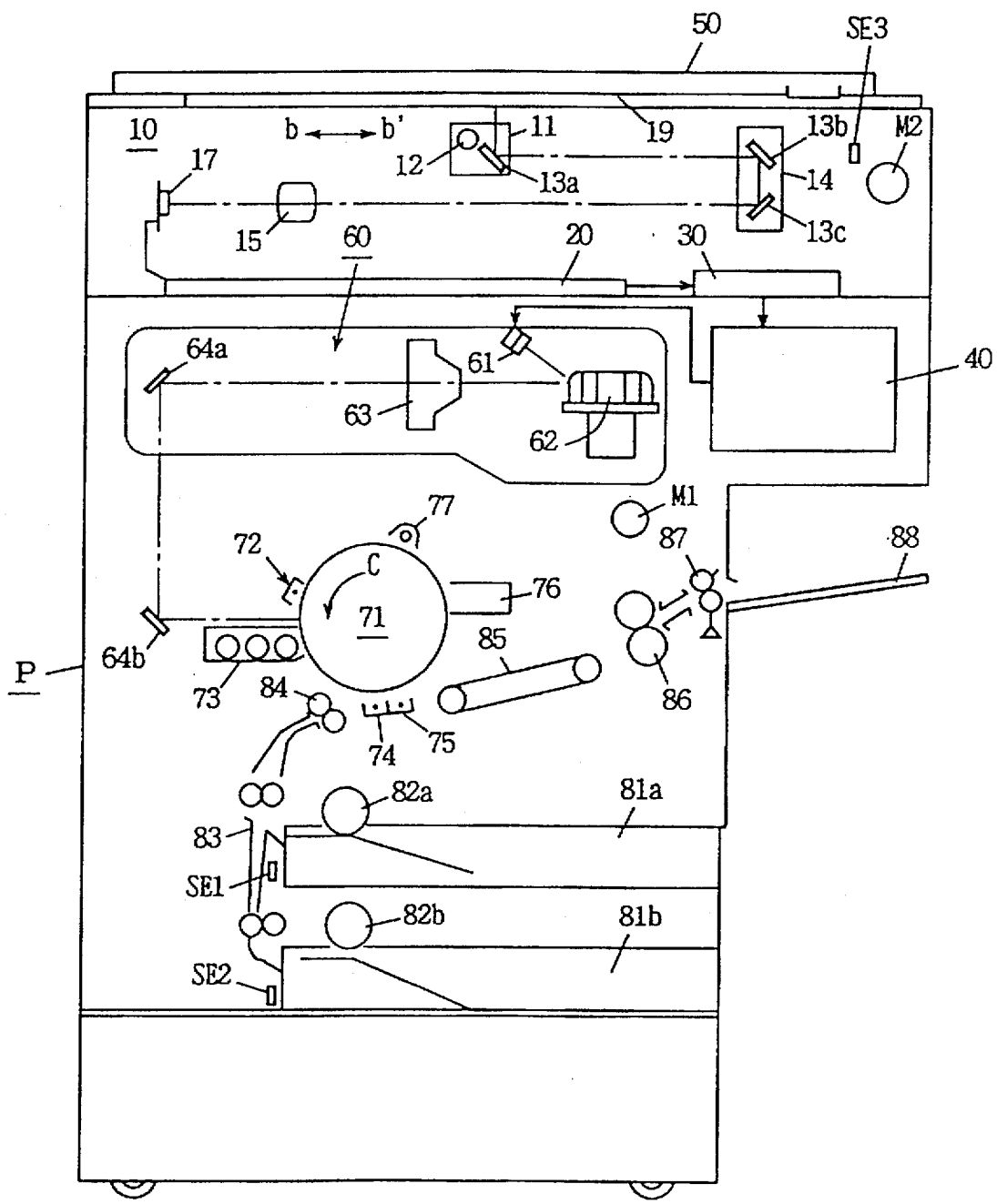
FIG. 1 is a schematic view of a digital copy machine according to the present invention.

Referring to FIG. 1, a digital copy machine includes a reading unit 10, and a print unit P for printing on a sheet an image corresponding to the image data sent from reading unit 10.

Reading unit 10 reads the image of an original mounted on a platen glass 19 to produce image data corresponding to each pixel in the image of the original. A first scanner 11, including an exposure lamp 12 and a first mirror 13a, and a second scanner 14, including second and third mirrors 13b and 13c, move in the direction of arrows b and b' (sub-scanning direction) by the drive of a scan motor M2. The light of exposure lamp 12 is reflected by the original on platen glass 19 to be directed to a line sensor 17 via mirrors 13a, 13b, and 13c and a lens 15. Line sensor 17 has a plurality of photoelectric conversion elements (CCD) arranged in a direction orthogonal to the paper plane of FIG. 1 (main scanning direction) to read an image at 400 DPI to output image data corresponding to each pixel. Line sensor 17 sub-scans the original image by the movement of first and second scanners 11 and 14 in the respective direction of arrows b and b'. A sensor SE3 serves to detect whether first scanner 11 is at home position. Scan motor M2 moves first and second scanners 11 and 14 in the direction of arrow b faster than in the direction of arrow b'. More specifically, image scanning by line sensor 17 when scanners 11 and 14 move in the direction of arrow b is a pre-scan operation in which the position of the original on platen 19 is detected according to image data outputted from line sensor 17. The image scanning operation by line sensor 17, when scanners 11 and 14 move in the direction of arrow b', is the main scanning operation where the original image is copied according to image data outputted from line sensor 17.

The face of an original cover 50 at the platen glass side is colored identical to the color of the lamp. Therefore, the light of exposure lamp 12 reflected from original cover 50 becomes a color of low spectral sensitivity for line sensor 17. More specifically, original cover 50 is equal to black for line sensor 17. Since the base of an original is generally white, line sensor 17 can distinguish the original from the bottom face of original cover 50 even when the copy machine has original cover 50 closed. Furthermore, the original region can be identified even when original cover 50 is not closed since the light of exposure lamp 12 reflected from original cover 50 does not reach line sensor 17.

Image data outputted from line sensor 17 are processed by an image process unit 20 to be provided to a memory unit 30. Memory unit 30 stores image data from image process unit 20, or provides the image data directly to print unit P.

Print unit P will be described hereinafter. A printing process unit 40 controls a laser optical system 60 according to the image data from memory unit 30. Laser optical system 60 includes a laser diode 61 for emitting a laser beam that is modulation-controlled (on, off) by printing process unit 40, a polygon mirror 62 for directing the laser beam emitted from laser diode 61 onto a photoreceptor drum 71 for scanning, a fθ lens 63, and mirrors 64a and 64b.

At the perimeter of photoreceptor drum 71, rotatably driven in the direction of arrow c, are provided a corona charger 72, a developing unit 73, a transfer charger 74, a separation charger 75, a cleaner 76, and an erasure lamp 77 along the rotating direction (direction of arrow c). A toner image is formed to be transferred onto a sheet by the well known electrophotographic process. A sheet is provided from paper feed cassettes 81a and 81b by means of paper feed rollers 82a and 82b to be conveyed to the position of transfer charger 74 via a sheet transportation path 83 and a timing roller 84. The sheet having a toner image transferred thereon at transfer charger 74 is discharged to a discharge tray 88 via a transportation belt 85, a fixing unit 86, and a discharge roller 87. The rollers and photoreceptor drum 71 are driven by main motor M1. Sheet size detection sensors SE1 and SE2 are provided in the vicinity of paper feed cassettes 81a and 81b for detecting the size of the sheet accommodated in each cassette.

Figure 2:
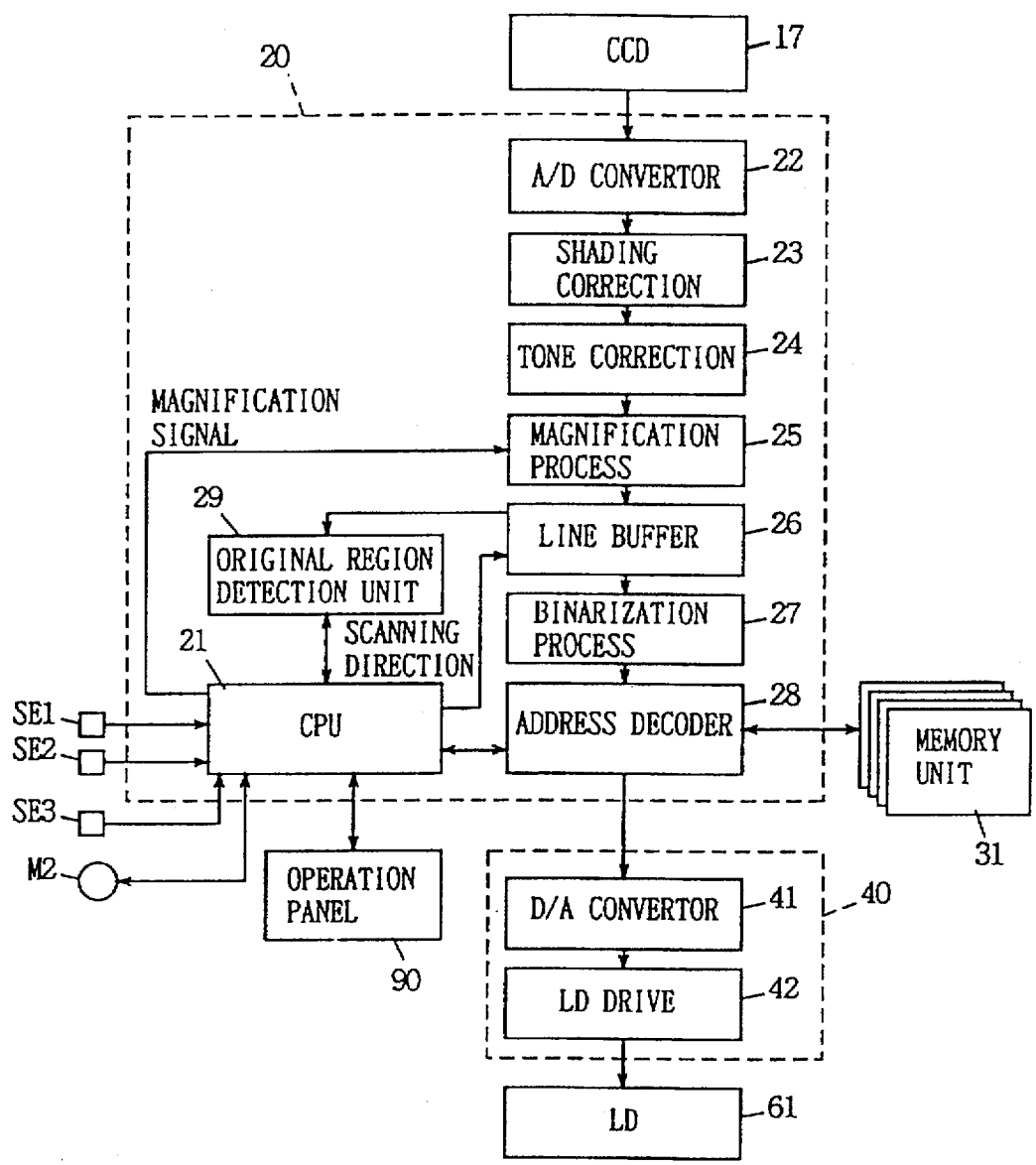
FIG. 2 is a block diagram of a control circuit of a digital copy machine.

The control circuit of the present digital copy machine will be described hereinafter with reference to FIG. 2.

Image process unit 20 includes a CPU 21 for controlling the timing of the entire machine, an A/D converter 22, a shading correction unit 23, a tone correction unit 24, a variable scale magnification process unit 25, a line buffer 26, a binarization process unit 27, an address decoder 28, and an original region detection unit 29. An image read synchronizing signal is applied from CPU 21 to line sensor 17, image process unit 20, memory unit 30 and printing process unit 40.

The signal output from line sensor 17 for each one line is analog data. These analog data are converted into digital image data of 8 bits per pixel by A/D converter 22. The digital data are subjected to a shading correction by shading correction unit 23, and then subjected to tone correction such as MTF correction, gamma correction, and the like by tone correction unit 24. A variable scale magnification process is carried out by variable scale magnification process unit 25. Line buffer 26 stores one line of image data subjected to a variable scale magnification process, and includes a switching function to provide the image data to image region detection unit 29 and to binarization process unit 27 when scanners 11 and 14 move in the direction of b (forward movement) and in the direction of b' (backward movement).

Image region detection unit 29 detects the position of the original on platen glass 19. Binarization process unit 27 converts the image data of 8 bits into binary data by an error diffusion process. The converted data are sent to an address in memory unit 30 specified by address decoder 28. Memory unit 30 has a capacity that can store 50 pages of an original of A3 size. An image memory 31 of one page therein is formed to have a two dimensional address wherein address x and address y are specified in the sub-scan direction and the main scan direction, respectively. Because the present copy machine reads out an A3 original at 400 DPI, x is set in the range of 0 to 6799, and y in the range of 0 to 4799. A similar image memory is provided for the other 49 pages.

The image data written into memory unit 30 is transferred to printing process unit 40 according to an instruction from CPU 21. Printing process unit 40 converts the received digital image data into analog data by a D/A converter 41. An LD drive unit 42 controls the drive of laser diode 61 according to the converted image data. CPU 21 also carries out control of signal input and display from various operation keys on an operation panel 90.

Figure 3:
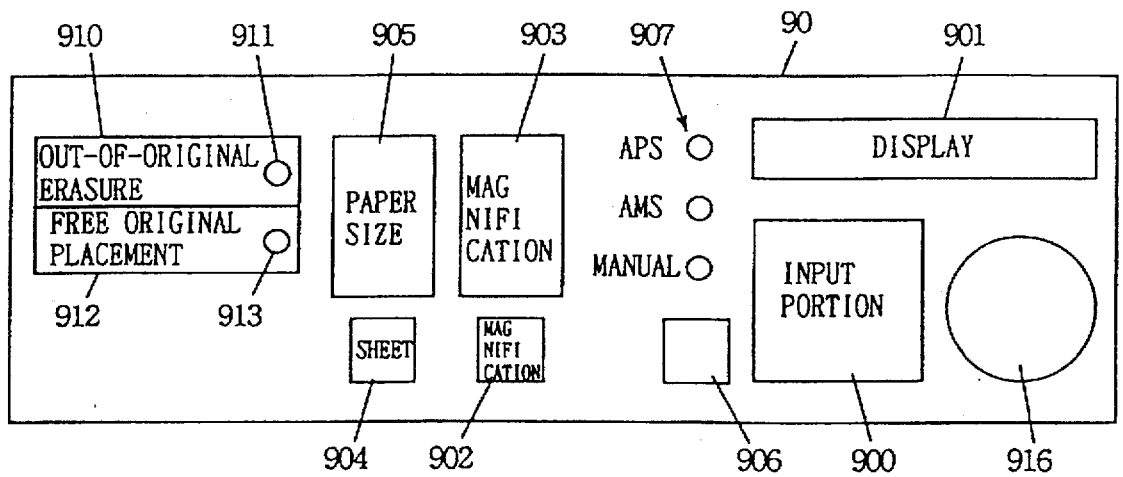
FIG. 3 is a top view of an operation panel of a digital copy machine.

Operation panel 90 of the present digital copy machine will be described hereinafter with reference to FIG. 3.

Operation panel 90 includes an input portion 900 for entering numerics such as to specify the number of copies.

Generally a ten key input device is arranged therein. A message display unit 901 displays the set number and various messages for guidance. A key 902 is provided to select one of a plurality of copy magnifications displayed in a magnification display 903. The selected magnification is switched at each depression of key 902. A key 904 is provided to select one of a plurality of sheet sizes displayed in sheet size display 905 (distinguishable displays are provided for the sheet size set in paper feed cassettes 81a, 81b, and other sheet sizes). The sheet size is switched at every depression of key 904. A key 906 is provided to select an automatic paper select (APS) mode, an automatic magnification select (AMS) mode, and a manual mode. The selected mode is switched at each depression of key 906. The APS mode is to automatically select an optimum sheet size for copying according to the detected original size and the copy magnification specified by the user (the magnification select key 902). The AMS mode is to automatically select a copy magnification of the optimum size for copying according to the detected original size and the sheet size specified by the user (the size selected by key 904). The manual mode is to carry out a copy operation according to the magnification and sheet size specified by the user.

A key 910 specifies an out-of-original erasure mode, and a key 912 specifies a free original placement mode. A depression specifies each mode, and another depression cancels the specification. The selection of each mode is identified by the relevant lamps 911 and 913 being turned on.

The out-of-original erasure mode and the free original placement mode will be described hereinafter.

The out-of-original erasure mode determines the region where the original is mounted, and erases image data other than that of the region for copying.

The free original placement mode is characterized in that the center of the original will be copied at the center of the sheet even when the original is placed at an arbitrary position on platen glass 19. The details thereof will be described in the following.

Figure 4A:
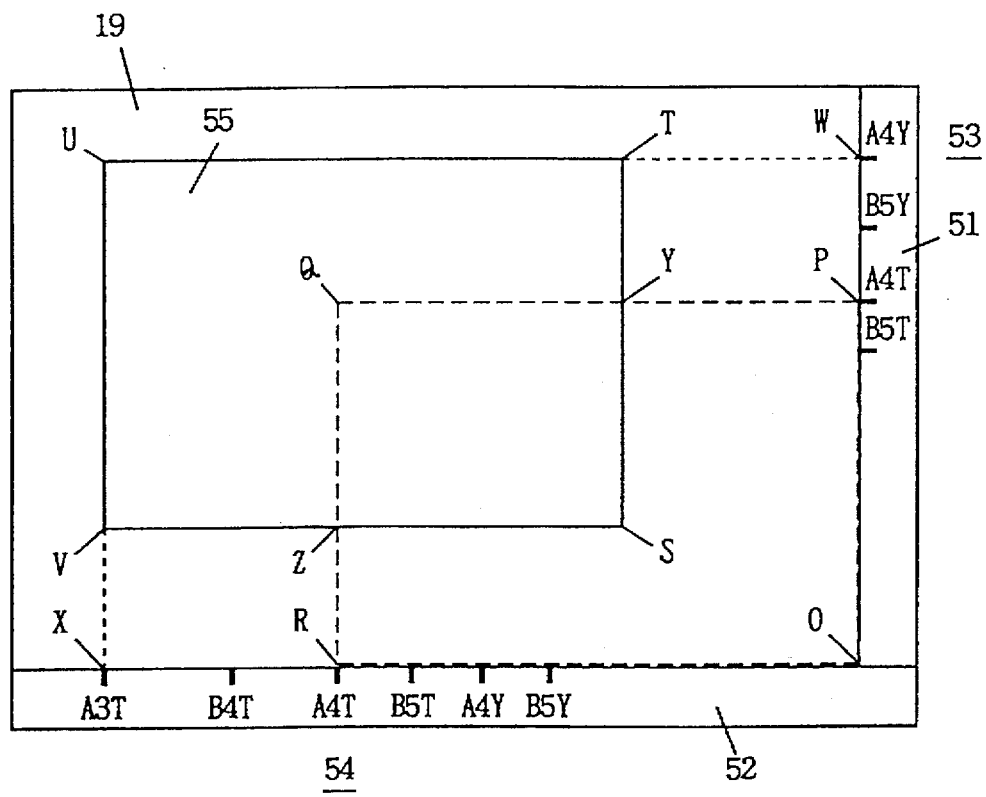
FIGS. 4a and 4b show an original and the same placed on a platen glass.
Figure 4B:
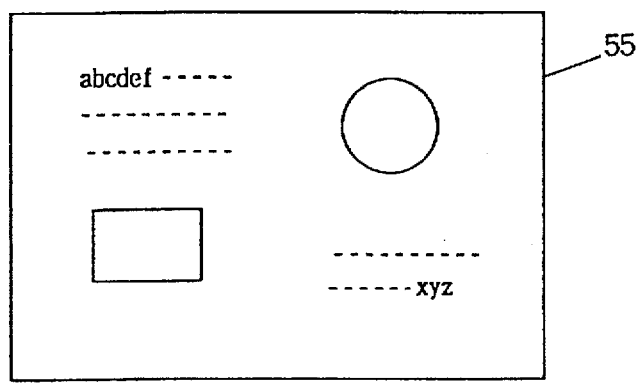
Figure 5D:
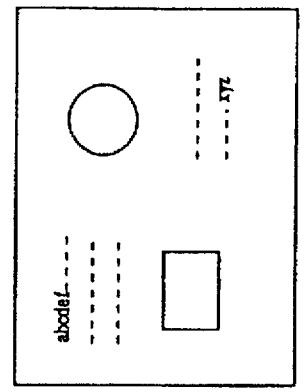
FIGS. 5a–5d and FIGS. 6a–6d are diagrams for describing an out-of-original erasure mode and a free original placement mode.
Figure 5C:
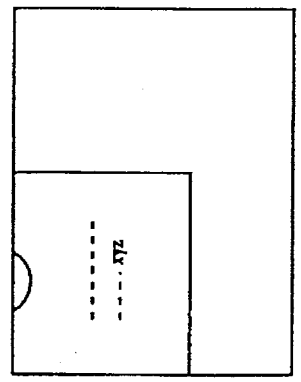
Figure 5B:
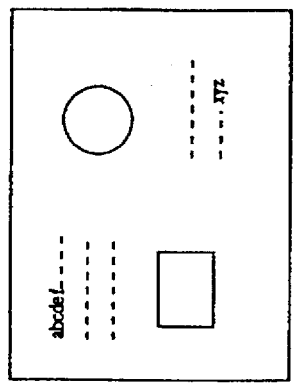
Figure 5A:
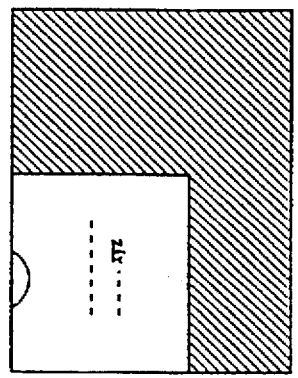

FIG. 4a shows the case where an A4-size original 55 (refer to FIG. 4b) is placed on platen glass 19. Original scales 51 and 52 are provided at the right side and the bottom side of platen glass 19, when viewed according to the plane of FIG. 4a. Original scales 51 and 52 serve as guides in setting an original, and are marked with indices 53 and 54 corresponding to respective sheet sizes with the right bottom corner O as the reference position. When a sheet size of A4 is specified without selecting a free original placement mode, the image in a region OPQR on platen glass 19 is copied. When a sheet size of A3 is selected, the image in region OWUX is copied. In FIG. 4a, A4 original 55 is set at a region STUV which is offset from region OPQR. When original 55 is copied on a sheet of A4 in size without specifying a free original placement mode, only the image of a region SYQZ overlapping the region OPQR of original 55 is copied. The obtained copy image is shown in FIG. 5a. The hatched area in FIG. 5a shows the image of original cover 50 represented as solid black on the copy sheet since an out-of-original erasure mode is not selected. When a copy operation is carried out with the free original placement mode specified, the center of original 55 is automatically detected so that the image at the center of the original 55 is copied on the center of the sheet, as shown in FIG. 5b. When the out-of-original erasure mode is selected, the presence of original 55 only in region SYQZ out of region OPQR on platen glass 19 is automatically detected as shown in FIG. 5c, and a copy image is produced that has the image outside region SYQZ (the bottom face of original cover 50) erased. FIG. 5d shows a copy image obtained when both the free original placement mode and the out-of-original mode are selected. Similarly, FIGS. 6a–6d show an original image copied on a sheet according to each mode in the case where original 55 is placed as shown in FIG. 4a, and A3 vertical and equal-magnification are specified for the sheet size and the magnification, respectively.

When an APS mode is selected, a sheet is automatically selected that allows a copy of a rectangular region OWUX determined by original set reference position O and a top point, or corner, U of original 55 most distant from reference position O at the specified magnification. When an AMS mode is selected, a copy is obtained at the maximum magnification in which region SYQZ where a frame OPQR corresponding to the selected sheet and original region STUV overlapped each other fits in the selected sheet. It is also possible to take into account the outside margin in APS and AMS modes. It is also possible to combine the out-of-original erasure and free original placement modes with the APS and AMS modes.

The copy operation under the control of CPU 21 by the present digital copy machine will be described with reference to FIG. 7.

When a copy start button 916 is depressed at time t0, scan motor M2 of reading unit 10 drives scanners 11 and 14 to initiate scanning of an original in the direction of b (forward movement). At the same time, exposure lamp 12 is turned on, and scanner 11 moves away from home position sensor SE3 (time t1). Line sensor 17 outputs an image signal. The scanning of the original in direction b (forward movement) is completed at time t2, and the brakes of scan motor M2 are applied, whereby scan motor M2 begins to rotate in the opposite direction at time t4. The scanning of the original in direction b' (backward movement) is initiated. Because only the original mounted region is to be identified at the time of a forward movement, the scanning speed in direction b is set 16 times that of a backward movement.

From time t2, original region detection unit 29 carries out a detection process of the original mounted region on platen glass 19. The detection result is obtained at time t3. The scanning speed of an original is determined in advance, and the time required for detecting the original position (t3–t1) is also stored in CPU 21. Time t5 for line sensor 17 to read the trailing edge of the original at the backward movement and time t6 for reading the leading edge of the original are identified at time t3. At time t5, the output of line sensor 17 is subjected to the above-described image processes and written into image memory 31.

At time t6, line sensor 17 reads the trailing edge of the original, and the writing of the image data of the original into image memory 31 ends.

At time t7, home position sensor SE3 is turned on again. Here, the brakes are applied to stop scan motor M2, and the output of line sensor is halted. Exposure lamp 17 is turned off. Thus, original image reading and image data writing to image memory 31 are completed. At time t8, printer unit P is actuated. At time t9, reading out image data from image memory 31 and image formation are initiated. By the above-described timing, an original image is copied on a sheet according to the selected copy mode.

Figure 7:
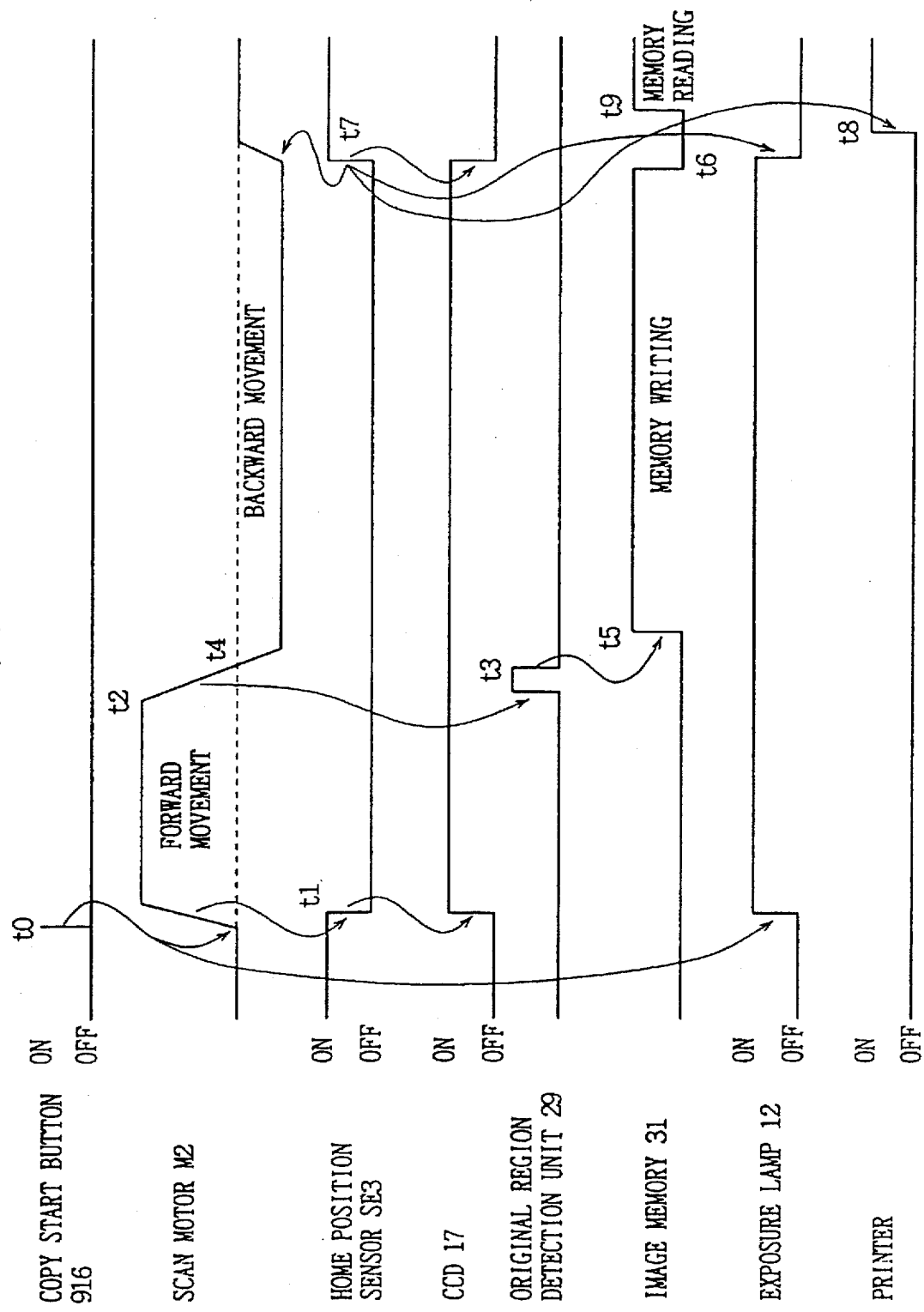
FIG. 7 is a timing chart showing the operation timing of a digital copy machine.

In the present digital copy machine, the entire region of platen glass 19 is scanned in a pre-scanning operation (forward movement) as shown in FIG. 7. This is to improve the detection accuracy of an original mounted region.

Figure 8A:
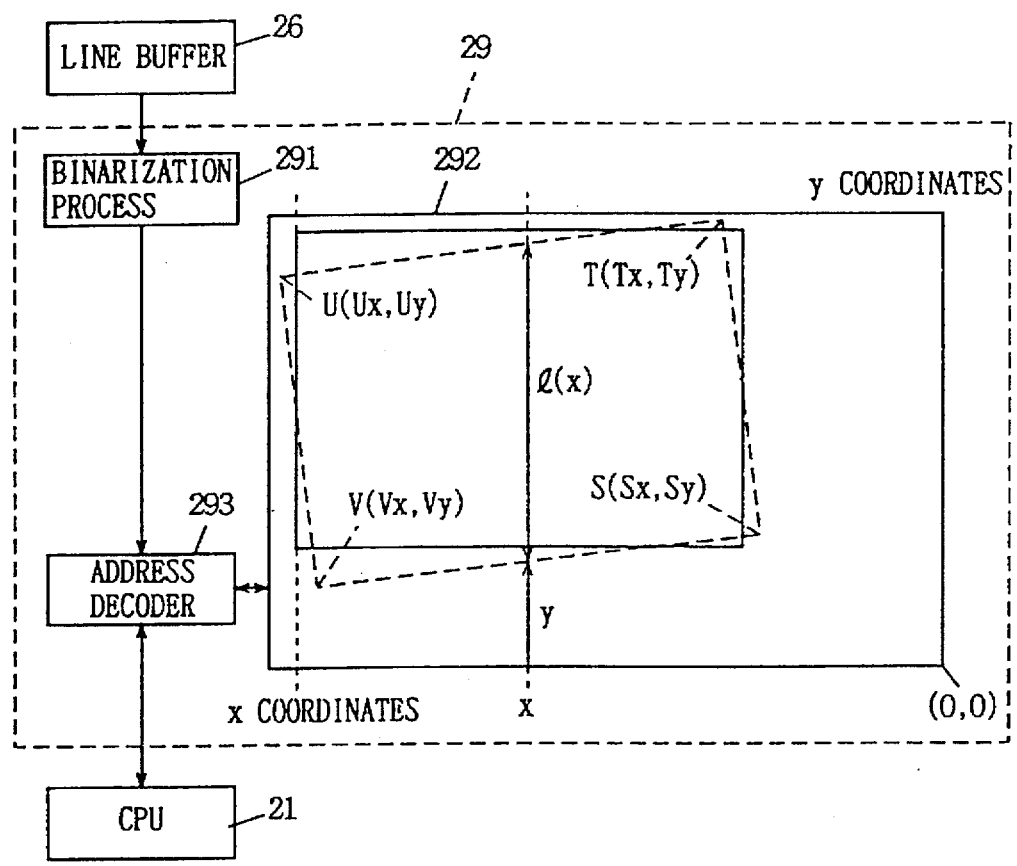
FIGS. 8a and 8b are block diagrams showing an original region detection unit.
Figure 8B:
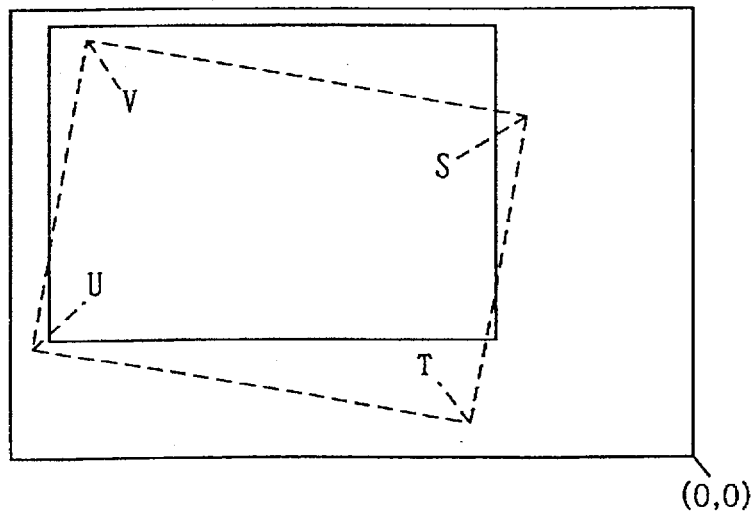

Detection of an original mounted region is carried out as set forth in the following. FIGS. 8a and 8b show a structure of original region detection unit 29.

At a forward scanning operation, the output from line sensor 17 is subjected to an image process and then stored in line buffer 26. The image data from line buffer 26 are binarized by a binarization unit 291 in original region detection unit 29. Differing from binarization circuit 27, binarization circuit 291 carries out a simple binarization process since it is directed to detection of an original region. Binarization circuit 291 has a threshold value higher than that of binarization circuit 27, so that erroneous detection is avoided even when there is a black image of a large area in the original image, and when the outside margin of a book original is noticeable. More specifically, binarization circuit 291 makes determination of black when the density level is 256/256~200/256, whereas binarization circuit 27 makes determination of black when the density level is 256/256~128/256. Here, variable scale magnification unit 25 carries out an equal magnification process according to a magnification signal from CPU 21 regardless of the magnification specified by copy magnification select key 902.

The binarized image data from binarization circuit 291 is stored in a region memory 292 in original region detection unit 29 under the instruction of address decoder 293 by CPU 21. Although CPU 21 processes a train of image data in the main scanning direction at the unit of 2 bytes (16 pixels), only image data of 1 pixel of the most significant bit is written into region memory 292. More specifically, image data outputted from line sensor 17 at the resolution of 400 DPI is skipped by CPU 21 so that the resolution in the main scanning direction becomes 1/16 (25 DPI), and then is stored in region memory 292. Furthermore, because the moving speed of first scanner 11 in a forward movement is 16 times faster than in a backward movement, the speed of line sensor 17 sub-scanning an original image is 16 times that of a backward movement. In contrast, the reading of line sensor 17 is carried out according to a standard clock of a constant period. Therefore, the resolution in the sub-scan direction of the image readout by line sensor 17 in the forward movement becomes 25 DPI which is 1/16 that of a backward movement. Thus, image data of a low resolution (25 DPI) are stored in both the main scanning direction and the sub-scanning direction in region memory 292. This is because it is not necessary to identify an image at high resolution since only the original position is required in original region detection unit 29. The time required for image processing to detect the original position becomes shorter as the amount of image data is smaller. The pixel interval in an image with a resolution of 25 DPI is approximately 1 mm. Therefore, the position of an original can be detected at the unit of approximately 1 mm in the present embodiment.

Region memory 292 has two dimensional addresses of x and y specified. The image data stored therein represent the state of the original on platen glass 19. An original is often placed with a slight inclination. FIG. 8a shows an original placed tilting counterclockwise in broken lines. FIG. 8b shows an original placed slightly tilted clockwise in broken lines. The four top points, or corners of an original in FIGS. 8a and 8b are labeled as S, T, V and U clockwise.

Figure 9:
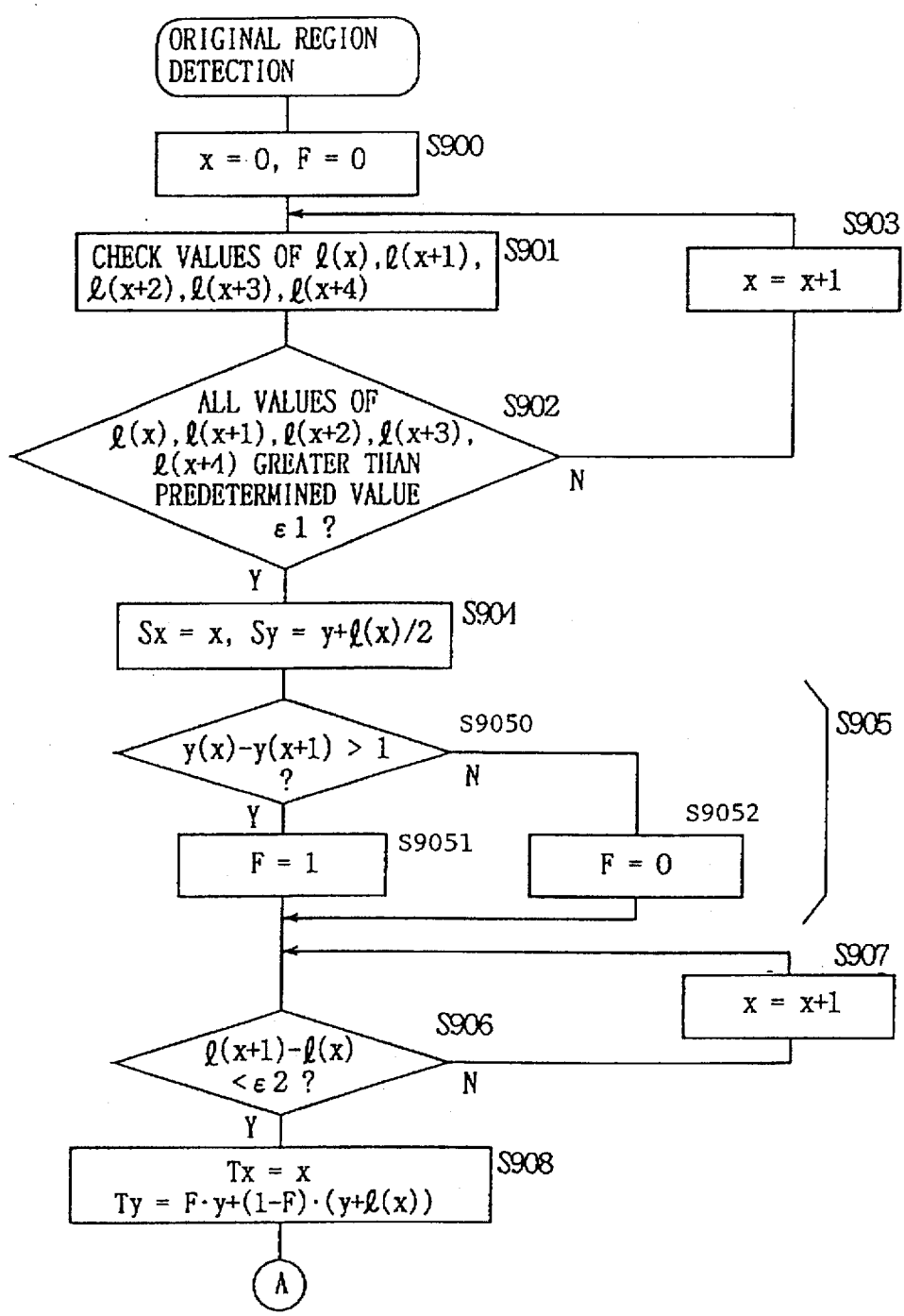
FIGS. 9 and 10 are flow charts showing an original region detection process.
Figure 10:
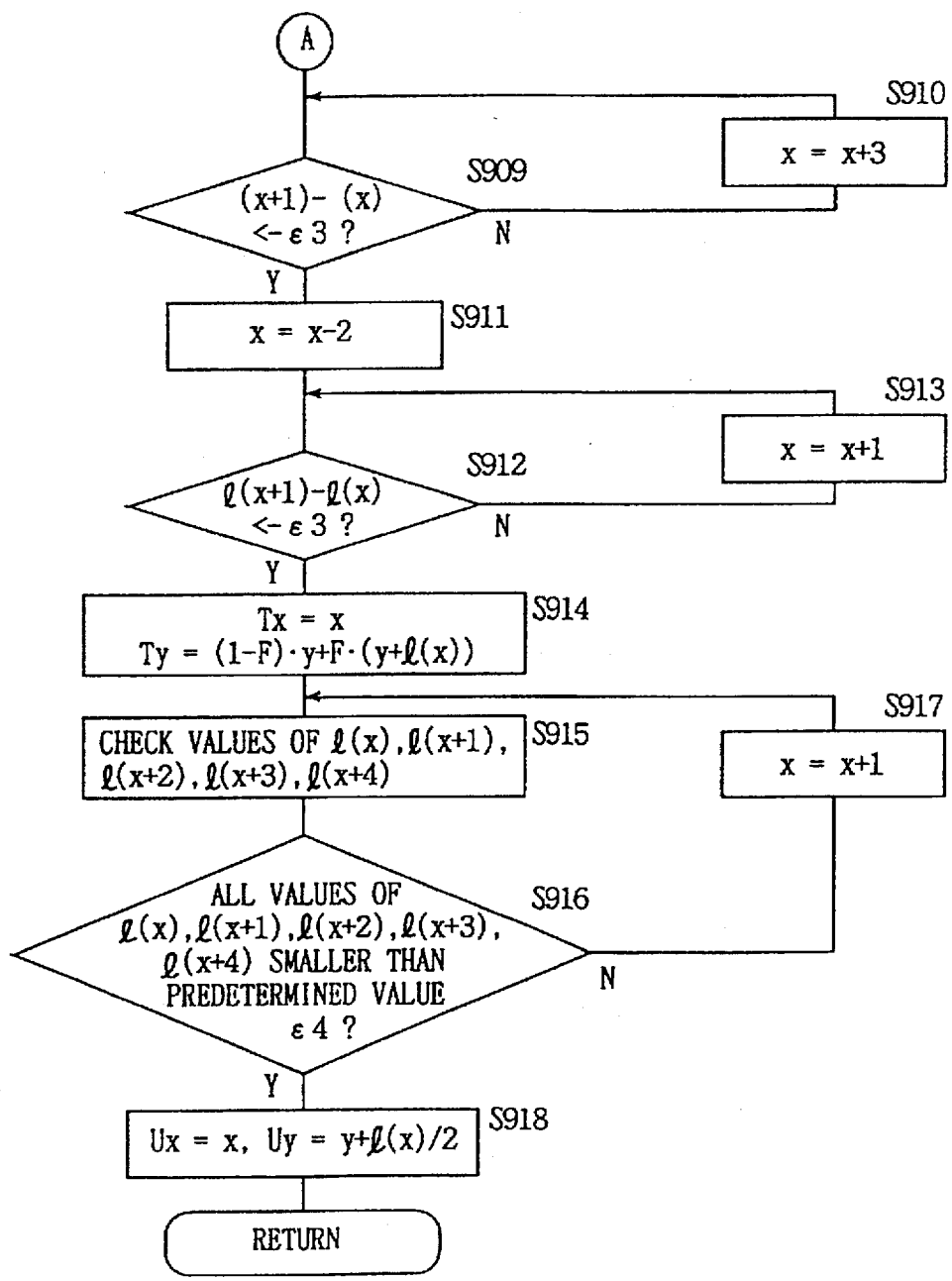

FIGS. 9 and 10 are flow charts showing the process of CPU 21 detecting an original position.

At step S900, the value of address x in region memory 292 is set to 0, and variable F is set to 0. A check is initiated from line x=0. At step S901, the number of white pixels l(x)~l (x+4) in each line for every 5 continuous lines is counted (l(x) is shown in region memory 292 in FIG. 8). At step S902, determination is made whether all the values of l(x)~l(x+4) are greater than a predetermined value ε1. Approximately 2 mm is appropriate for any values of ε1 and ε2~ε4 which will be described afterwards. When at least one of l(x)~l(x+4) is smaller than ε1 (step S902:NO), x is incremented until all the values of l(x)~l (x+4) become larger than ε1 (step S903), and the process of steps S901~S902 is repeated. When all the values of l(x)~l(x+4) become greater than ε1, determination is made that the top point, or corner, S of the original is detected, and the x coordinate Sx of top point S is set to Sx=x, and the y coordinate Sy is set to Sy=y(x)+l(x)/2 (step S904). y(x) is the minimum value of address y of the continuous white pixels in the x-th line. Erroneous determination due to dust or dirt on platen glass 19 can be avoided by carrying out a determination in the units of 5 lines while incrementing the value of x by 1.

Step S905 serves to make determination of an inclination of the original on platen glass 19. At step S9050, y(x) is compared with y(x+1). When the original is tilted clockwise (FIG. 8b), y(x) is greater than y(x+1) (step S9050:Y), and variable F is set to 1 (step S9051). When the original is tilted counterclockwise (FIG. 8a), y(x) is smaller than y(x+1) (step S9050:N), and variable F is set to 0 (step S9052). More specifically, variable F=1 indicates that the original is tilted clockwise, and variable F=0 indicates that the original is tilted counterclockwise.

At steps S906~S908, top point, or corner, T is detected. First, the difference in the number of white pixels in adjacent lines is compared with a predetermined value ε2 (step S906). When the difference in the number of white pixels is greater than ε2 (step S906:N), x is incremented (step S907), and the determination of step S906 is repeated until the difference in the number of white pixels becomes smaller than ε2. When the difference in the number of continuous white pixels of adjacent lines becomes smaller than ε2 (step (S906:Y), determination is made that top point T of the original is detected. The x coordinate Tx and the y coordinate Ty of top point T are set as Tx=x and Ty=Fy+(1−F) x (y+l(x)).

At steps S909–S914, top point, or corner, V is detected. The value of x is incremented by 3 (step S910) until the difference in the continuous number of white pixels in adjacent lines becomes smaller than −ε3 (step S909).

There are many lines between top point T of the leading edge to top point V at the trailing edge of the original. Determination of top point V for every 1 line will be too time-consuming. It is desirable to improve the entire detection speed even at the expense of the accuracy since the influence of dust on platen glass 19 is almost negligible. Therefore, the value of x is incremented by 3 in step S910 to make determination of a trailing edge of the original for every 3 lines.

When the difference in the continuous number of white pixels in adjacent lines becomes smaller than −ε3 (step S909:Y), the value of x is reduced by 2 (step S911). This is because there is a possibility of the value of x exceeding the x coordinate of the true top point when determination of step S909 results in Y since the determination of step S909 is based upon every 3 lines. A determination similar to that of step S909 is repeated while incrementing x by 1 until the difference in the number of white pixels in adjacent lines becomes smaller than −ε3 (steps S912~S913). Determination is made of detection of top point V of the original when the difference in the continuous number of white pixels in adjacent lines becomes smaller than −ϵ3 (step S912:Y). The x coordinate Vx and the y coordinate Vy of top point V are set to Vx=x, Vy=(1−F)y+F(y+1(x)).

Detection of top point, or corner, U is carried out according to a procedure similar to that of the detection of top point S. More specifically, the determination of step S916 is repeated and x is incremented until all the values of the continuous number of white pixels in adjacent 5 lines l(x)~l(x+4) become smaller than ϵ4. Determination is made of detection of top point U of the original when all the values of l(x)~l(x+4) becomes smaller than ϵ4. The x coordinate Ux and the y coordinate Uv of top point U is set to Ux=x and Uy=y(x)+l(x)/2 (step S918).

The coordinates for all the top points, or corner, of S, T, U, and V of an original are obtained as described above. The mounted position and size of the original can be identified according to the obtained coordinates of the top points. Then, main scanning is carried out on the original image. The obtained image data are outputted to print unit P.

Control or the main scanning will be described hereinafter.

Figure 11:
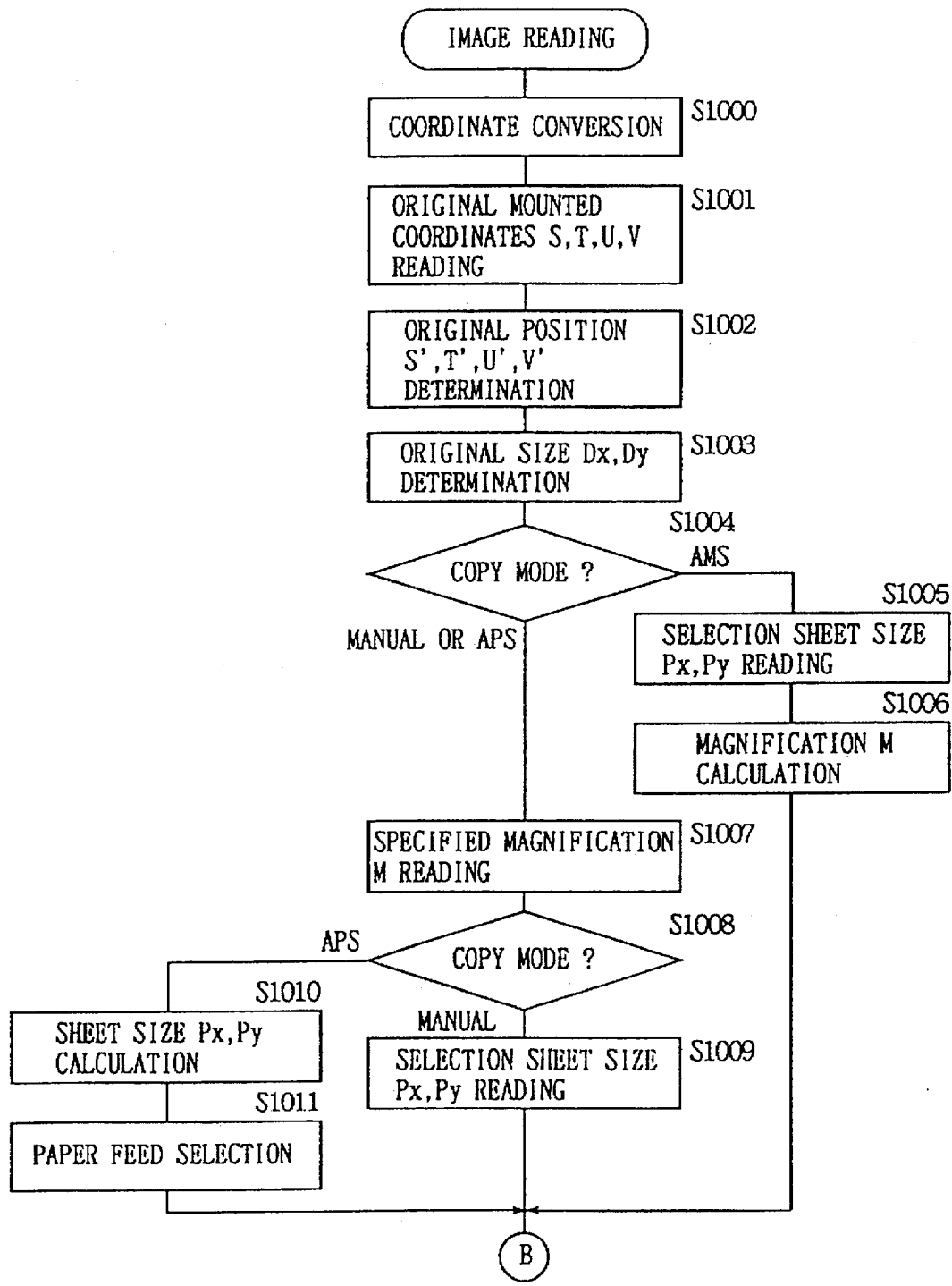
FIGS. 11 and 12 are flow charts showing an original image reading process.
Figure 12:
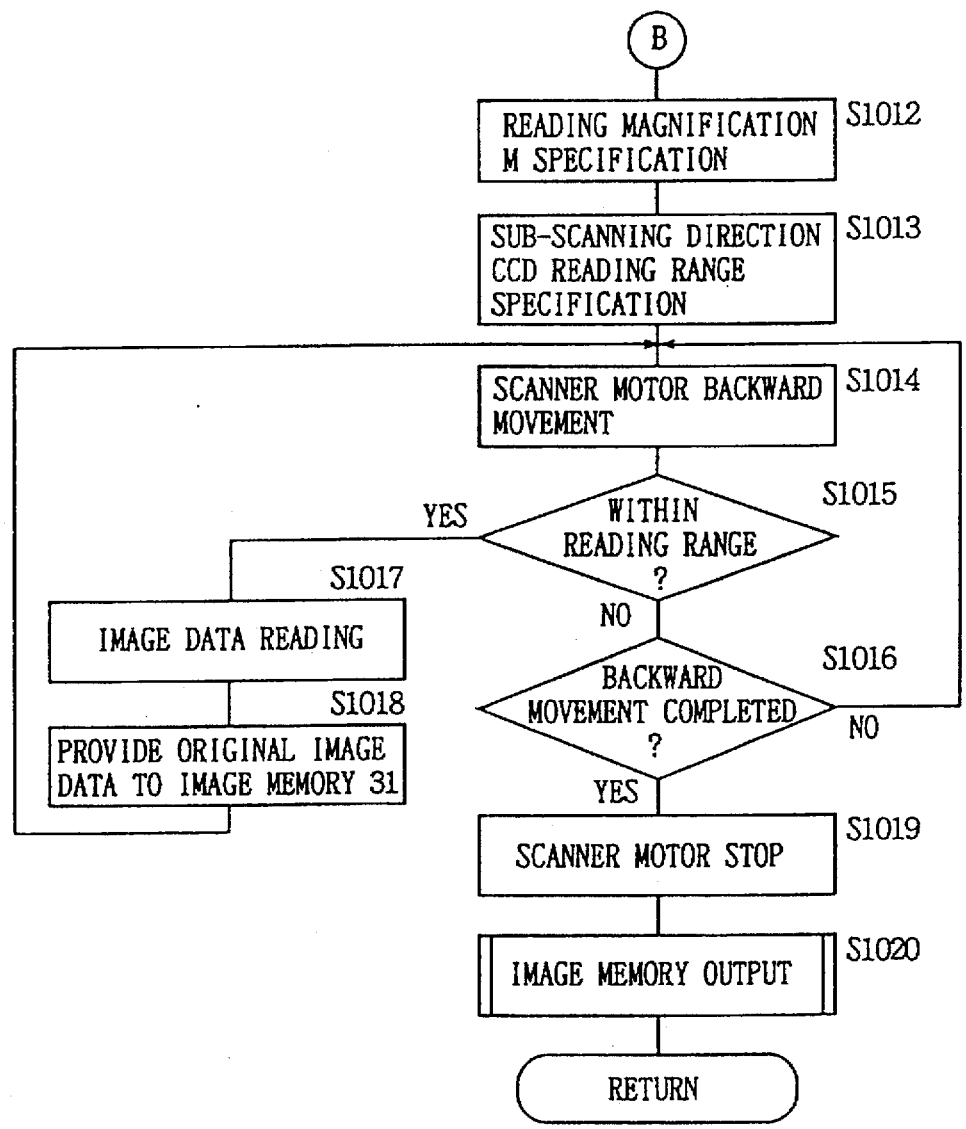

FIGS. 11 and 12 are flow charts showing control of writing image data obtained by main scanning into memory unit 30.

First, coordinate conversion is carried out at step S1000. More specifically, the detected coordinate values of top points S, T, U and V which are indicated by addresses x and y of region memory 292 are converted into the XY coordinates of image memory 31. As described above, image memory 31 has address X and address Y specified in the sub-scanning direction and the main scanning direction, respectively. The ranges of X and Y are specified as in the following equations 1a and 1b.

$$0 \leq X \leq 6799 \ (=X0) \tag{1a}$$

$$0 \leq Y \leq 4799 \ (=Y0) \tag{1b}$$

Because region memory 292 has a resolution that is 1/16 that of image memory 31, coordinate conversion is carried out in step S1000 according to the following equations 2a and 2b.

$$X=16x \tag{2a}$$

$$Y=16y \tag{2b}$$

Then, the coordinates of top points S, T, U, and V converted into XY coordinates are called up (step S1001). At step S1002, the coordinates of the top points of S' (S'x S'y), T' (T'x, T'y), U' (U'x, U'y), V' (V'x, V'y) are determined according to the following equations 3a–3h. Thus, an appropriate position determination can be carried out even when the original is placed in an inclining manner.

$$S'x=(Sx+Tx)/2 \tag{3a}$$

$$S'y=(Sy+Vy)/2 \tag{3b}$$

$$Tx=(Sx+Tx)/2 \tag{3c}$$

$$Ty=(Uy+Ty)/2 \tag{3d}$$

$$U'x=(Ux+Vx)/2 \tag{3e}$$

$$U'y=(Uy+Ty)/2 \tag{3f}$$

$$V'x=(Ux+Vx)/2 \tag{3g}$$

$$V'y=(Sy+Vy)/2 \tag{3h}$$

The length Dx (the length in the sub-scanning direction) and the width Dy (the length in the main scanning direction) of the original are determined by the following equations 4a and 4b (step S1003).

$$Dx=(S'x+T'x-U'x-V'x)/2 \tag{4a}$$

$$Dy=(T'y+U'y-S'y-V'y)/2 \tag{4b}$$

At step S1004, determination is made of the copy mode specified by key 906. When an AMS mode is selected, the length Px (the length in the sub-scanning direction) and width Py (the length in the main scanning direction) of the sheet specified by key 902 are determined (step S1005). Then, an optimum copy magnification M is calculated according to the original size Dx and Dy determined at step S1003 and size Px and Py determined at step S1005 using the following equation 5. The obtained magnification is stored in the memory of CPU 21 (step S1006). Then, the control proceeds to step S1012.

$$M=min \ (Px/Dx, Py/Dy) \tag{5}$$

where min (a, b) is the smaller of a and b.

When determination is made that a manual mode or an APS mode is selected at step S1004, the magnification M specified by key 902 is read out (step S1007). When determination is made at step S1008 that a manual mode is selected, the size Px and Py of the sheet selected by key 902 are read out (step S1009). When determination is made at step S1008 that an APS mode is selected, the size Px and Py of the required sheet are calculated according to original size Dx and Dy determined at step S1003 and magnification M specified by key 902 using the following equations 6a and 6b (step S1010).

$$Px=M \cdot Dx \tag{6a}$$

$$Py=M \cdot Dy \tag{6b}$$

Then, the paper feed cassette in which the sheet of the size appropriate to sheet size Px and Py obtained at step S1010 is selected. A warning message may be displayed on operation panel 90 if there is no paper feed cassette of the appropriate sheet set.

By the above-described processes, the original size Px, Py, the magnification M, and the sheet size Dx, Dy are determined regardless of the selected APS, AMS, and manual modes.

At step S1012, CPU 21 issues an instruction to variable scale magnification process unit 25 so that the reading magnification becomes M. The original readout range of line sensor 17 in the sub-scanning direction, i.e. t5 and t6 in the timing chart of FIG. 7, are determined by the following equations 7a and 7b (step S1003).

$$t5=-V'x/Vb'+t1+Const \tag{7a}$$

$$t6=-S'x/Vb'+t1+Const \tag{7b}$$

where

Vb': speed of backward movement of scanner 11 (scanning speed)

Const: inherent constant determined by the characteristics of scanners 11, 14 and scan motor M2.

The steps up to S1013 are carried out before time t3 in the timing chart of FIG. 7. At time t4, scan motor M2 is driven to initiate the backward movement of first and second scanners 11 and 14 (step S1014). At step S1015, the current time is compared with times t5 and t6. When the current time is previous to t5, first scanner 11 is outside the readout range, so that the determination result of step S1015 is NO. The determination at step S1016 whether the backward movement has been completed by home position sensor SE3 becomes NO, whereby the control returns to step S1014.

From time t5 to t6, the determination result of step S1015 is YES, whereby the program proceeds to step S1017. The image data outputted from line sensor 17 at step S1017 is subjected to image processing for every one line in the main scanning direction, and then provided to image memory 31 (step S1018). Image data are sequentially written into image memory 31 with Y=0 and X=0 as the standard for the main scanning direction and the sub-scanning direction, respectively.

Image data are processed by variable scale magnification process unit 25 prior to being written into image memory 31. Variable scale magnification process unit 25 carries out a skipping process in the units of lines when a reduction copy is selected, and an interpolation process between lines when a magnification copy is selected. Address X of image data of a certain line provided at time t is determined by the following equation 8.

$$X=\{(t-t5)/(t6-t5)\} \cdot M \cdot Dx + S''x \qquad (8)$$

When the address exceeds XO or YO in magnification, image data of an address exceeding the address of XO, YO are discarded.

Figure 14:
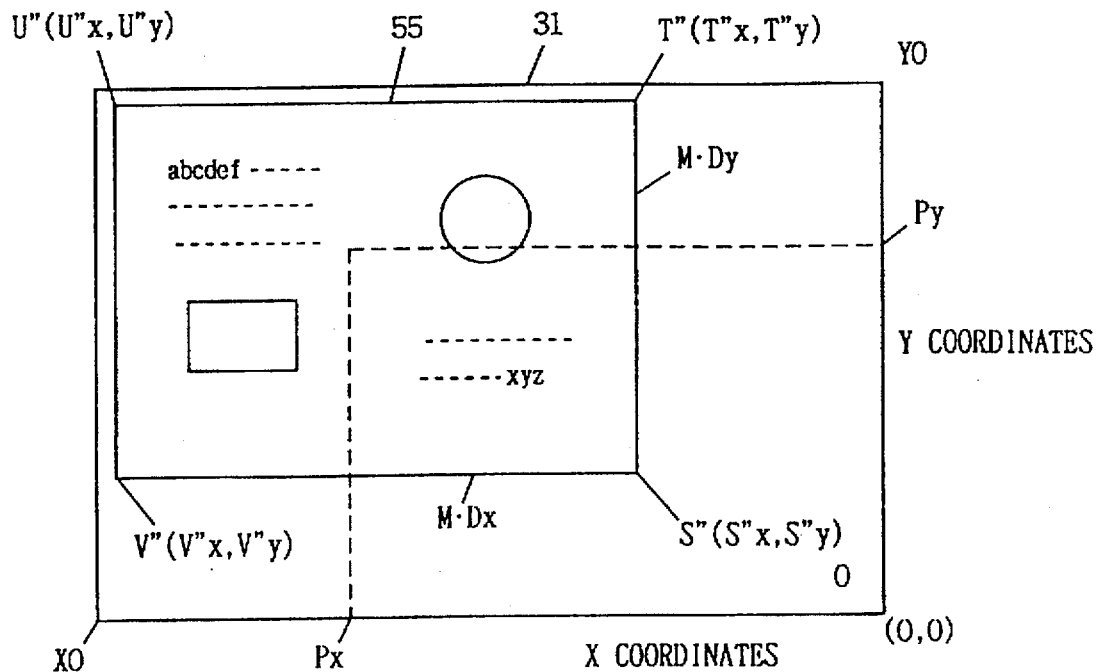
FIG. 14 is a diagram for describing an address to which image data are written into an image memory.

By the above-described process, image data of top points S, T, U, and V of the original are developed as S" (S"x, S"y), T" (T"x, T"y), U" (U"x, U"y), V" (V"x, V"y) on image memory 31 as shown in FIG. 14. These image data can be expressed as S" (M·S'x, M·S'y), T" (M·T'x, M·T'y), U" (M·U'x, M·U'y), V" (M·V'x, M·V'y) using magnification M.

Although the determination result of step S1015 becomes NO after time t6 since first scanner 11 exceeds the readout range, scan motor M2 continues its drive until home position sensor SE3 detects completion of a backward movement. When home position sensor SE3 detects completion of a backward movement (time t7), the determination result of step S1016 becomes YES, whereby the brakes are applied in scan motor M2 to enter a halt state (step S1019). At time t8, the printer initiates its drive. At time t9, the image data in image memory 31 is applied to printer (step S1020). The control returns to the main routine to carry out other processes.

The image memory output control subroutine of step S1020 in FIG. 12 will be described hereinafter with reference to FIG. 13.

At step S1101, determination is made whether an out-of-original erasure mode is selected. If YES, image data corresponding to those other than the original mounted region is erased (step S1102). This is the process of setting to 0 the image data of an address that satisfies $0 \leq X \leq V''x$, $S''x \leq X \leq X0$, $0 \leq Y \leq V''y$, or $U''y \leq Y \leq Y0$. It is appreciated from FIGS. 5a–5d and 6a–6d that original cover 50 is prevented from being printed on the sheet in a solid black manner by erasing image data other than those in the original mounted region. A similar effect is obtained even in the case where a copy is carried out without closing original cover 50.

At step S1103, determination is made whether a free original placement mode is selected. If YES, the image data within a rectangular region of a size corresponding to a specified sheet size with the center of points S", T", U", V" as the center is provided to the printer. More specifically, the X coordinates Xf1, Xf2 at the end sides in the X direction and the Y coordinates Yf1, Yf2 of the end sides in the Y direction of the rectangular region are obtained by the following equations 9a–9d.

$$Xf1=(V''x+S''x-Px)/2 \qquad (9a)$$

$$Xf2=(V''x+S''x+Px)/2 \qquad (9b)$$

$$Yf1=(T''y+S''y-Py)/2 \qquad (9c)$$

$$Yf2=(T''y+S''y+Py)/2 \qquad (9d)$$

Then, only the image data of an address satisfying $Xf1 \leq X \leq Xf2$ and $Yf1 \leq Y \leq Yf2$ are outputted to the printer in the order of X=Xf1, X=Xf1 +1, . . . .

When a free original placement mode is not selected (step S1103: NO), the image data of a region of a size corresponding to the specified sheet size, i.e. only the image data of an address that satisfied both $0 \leq X \leq Px$ and $0 \leq Y \leq Py$ with (0, 0) as the reference, are outputted to the printer in the order of X=0, X=1, . . . . The timing of initiating image data readout from image memory 31 at steps S1104 and S1105 is time t9 shown in the timing chart of FIG. 7.

Thus, an original mounted region is detected, an original image is read out, a process according to a copy mode is carried out on the readout original image, and image data are outputted to print unit P. An original image is formed on a sheet according to the received image data in print unit P.

Figure 6B:
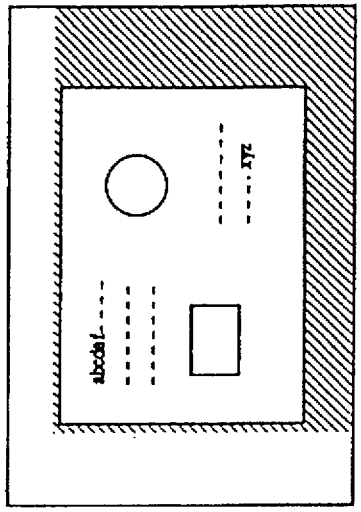
Figure 6D:
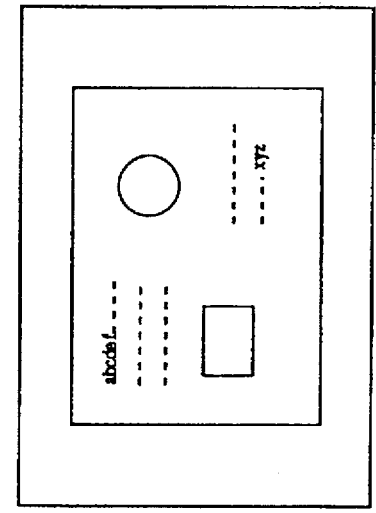
Figure 6A:
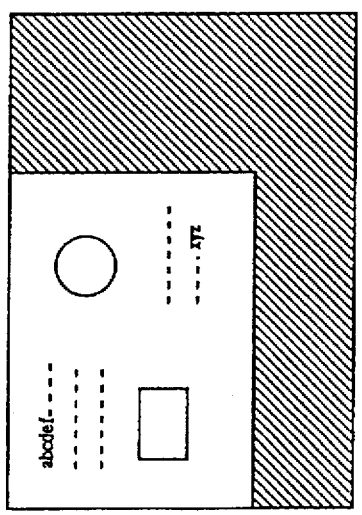
Figure 6C:
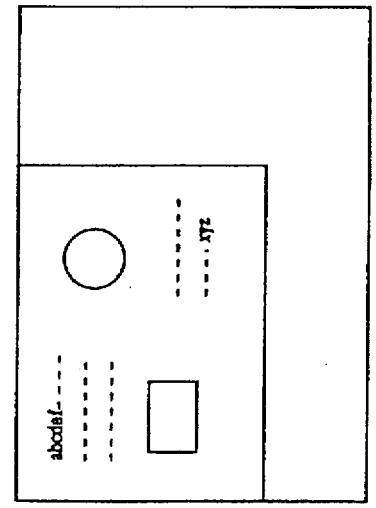

When a copy is carried out in a free original placement mode, the center of the sheet can be made to coincide with the center of the original even if the original is mounted on an arbitrary position on platen glass 19. If an out-of-original erasure mode is not selected, an image of original cover 50 will partially appear on the sheet depending upon the mounted position of the original and the size of the sheet as shown in FIG. 6b. In order to avoid such an undesirable output; (1) an out-of-original erasure mode is always selected when a free original placement mode is selected; or (2) when a free original placement mode is selected, selection of a manual mode is inhibited, and only an APS or an AMS mode is selectable. The control of these two possible settings is realized by adding a regulation on the mode selection by a key on operation panel 90. This will be described with reference to FIGS. 15 and 16.

Figure 15:
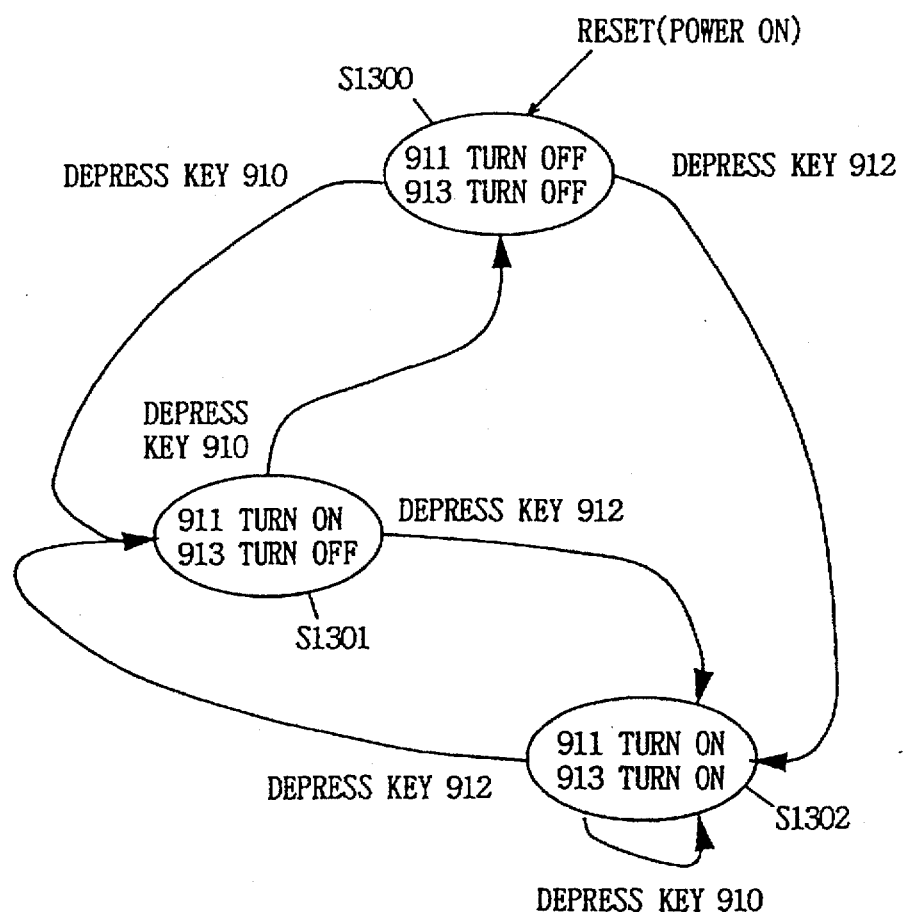
FIG. 15 shows the state transition regarding selection of a three original placement mode and an out-of-original erasure mode.

(1) FIG. 15 shows the key depression transition state for always selecting an out-of-original erasure mode when a free original placement mode is selected. When CPU 21 is reset such as at the time of power-on, the control is at the state of step S1300 where neither a free original placement mode nor an out-of-original erasure mode is selected. An out-of-original erasure mode is selected at the depression of key 910, whereby the control is at the state at step S1301. At the selection of a free original placement mode due to depression of key 912, the out-of original erasure mode is also selected at the same time (step S1302). This state does not change even if key 910 is depressed at step S1302.

Figure 16:
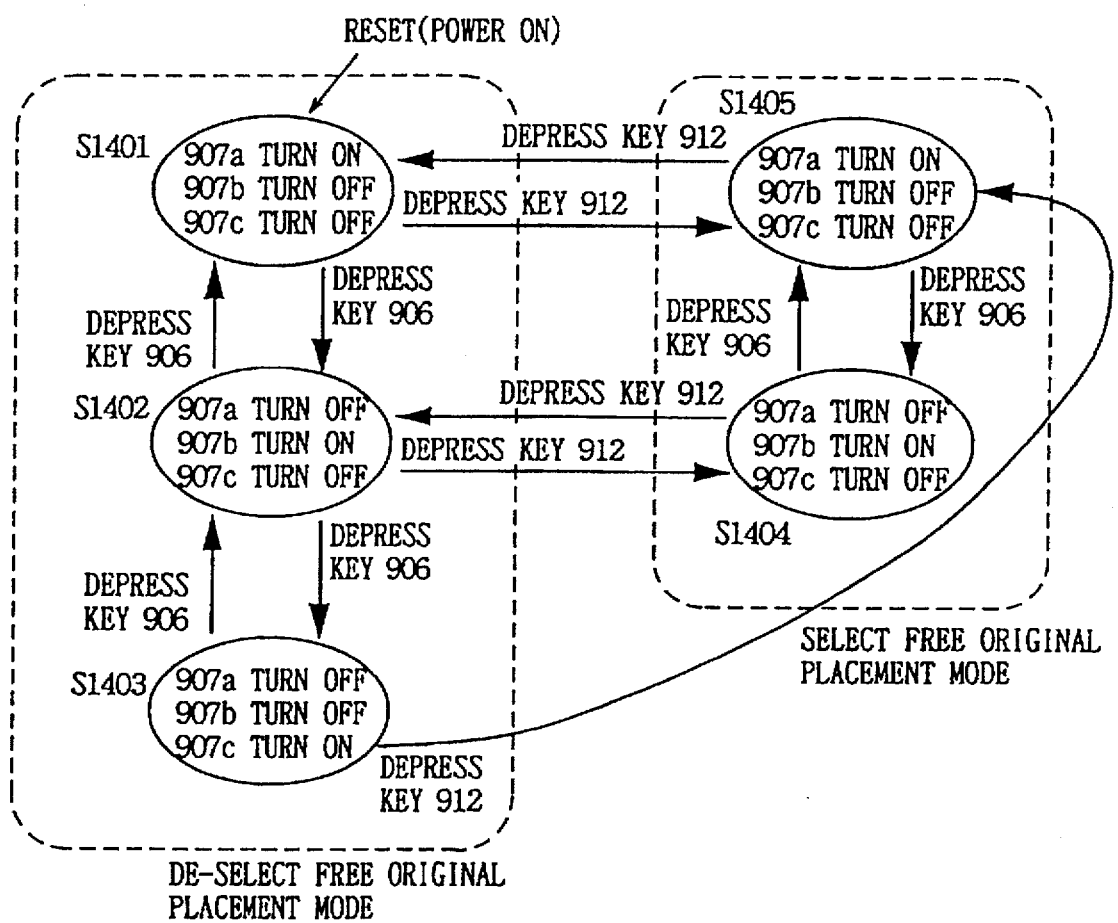
FIG. 16 shows the state transition regarding selection of an APS mode, an AMS mode, and a manual mode.
Figure 17:
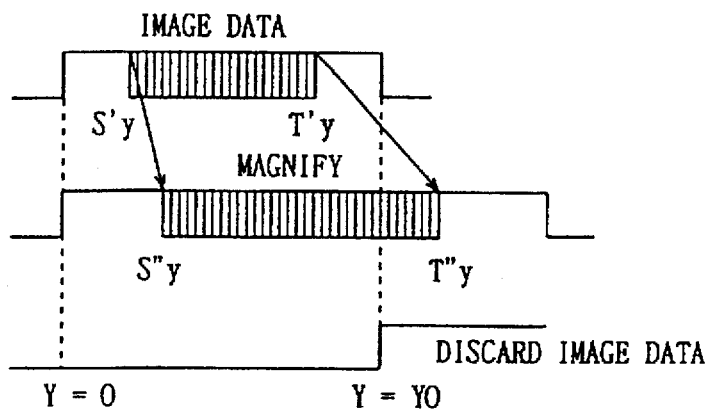
FIG. 17 is a diagram for describing the address of an image memory to which image data are written at the time of variable scale magnification.

(2) FIG. 16 shows the key depression transition state in order to inhibit selection of a manual mode when a free original placement mode is selected. When CPU 21 is reset due to the power turned on or the like, the control attains the state of step S1401. Here, the free original placement mode is de-selected, and the APS mode is selected. The state changes from step S1402 (selection of AMS mode) to step S1403 (selection of manual mode) at each depression of key 906. The control returns to the original step S1401 (AMS mode) at the third depression of key 906. The control of steps S1401 and S1402 proceeds to steps S1405 and S1404, respectively, at the depression of key 912, whereby the free original placement mode is selected. By pressing key 912 again, the control returns to respective steps S1401 and S1402. In the case of step S1403 (selection of manual mode), depression key 912 causes the control to proceed to step S1405, whereby the free original placement mode is selected in an APS mode. Either the above described (1) or (2) is implemented to avoid the image of original cover 50 from partially appearing on the sheet as shown in FIG. 6b.

When one line of image data in the main scanning direction is provided to image memory 31 at steps S1017 and S1018, the reference was Y=0 in the main scanning direction and X=0 in the sub-scanning direction. There is a possibility of image data not being provided to image memory 31 depending upon the mounted position of the original when a magnification process is carried out in a free original placement mode. For example, when image data in the address of S'y≦Y≦T' in equal magnification are to be enlarged at a magnification of M, the upper limit of T"y= M·T'y becomes greater than Y0, so that image data having an address Y exceeding Y0 will be discarded. A similar problem is encountered for the provision of image data in the sub-scanning direction.

Therefore, the main scanning direction address Y' for writing image data when providing image data of one line to image memory 31 at step S1018 under the selection of a free original placement mode is specified according to the following equation 10.

$$Y'=Y-S"y+(-M \cdot Dy+Py)/2 \quad (10)$$

Similarly, regarding image data in the sub-scanning direction, the sub-scanning direction address X' for writing image data to image memory 31 is set according to the following equation 11 when the time to provide image of that line is t. Image data are provided to image memory 31 with the original edge as the reference.

$$X'=\{(t-t5)/(t6-t5)\} \cdot M \cdot Dx+(\cdot M \cdot Dx+Px)/2 \quad (11)$$

Image data having an X' address outside 0≦X'≦X0 and image data having an Y' address outside the range of 0≦Y'≦Y0 are discarded. In carrying out a process according to equations 10 and 11, the process of steps S1103 and S1104 of FIG. 13 are not carried out, and image data are outputted according to step S1105 regardless of a selection of the free original placement mode. By carrying out these processes, the center of an original is always copied at the center of a sheet even if the original is placed on an arbitrary position on platen glass 19. Also, the original image can be copied over the entire region of the selected sheet size minimizing generation of image dropping.

Another embodiment of a de-selection of the free original placement mode will be described. It will be easy to copy a partial portion of the original by taking advantage of indices 53 and 54 on original scales 51 and 52 corresponding to various sizes of a sheet. A margin portion can be produced on the sheet by combining the out-of-original erasure mode for inserting notes or the like on the margin portion.

In carrying out a simple editorial process on the original utilizing indices 53 and 54, it is desirable to carry out the process set forth in the following for APS and AMS modes when the free original placement mode is deselected.

When the original is set as shown in FIG. 4a:

(A) Selection of APS Mode

A sheet is automatically selected that allows copying of a rectangular region OWUX determined by the original set reference position O and corner U of the original most distant from reference position O at the specified magnification.

(B) Selection of AMS Mode

A copy is carried out so that region SYQZ which is the overlapping portion of frame OPQR corresponding to the selected sheet and original region STUV fits in the selected sheet at the maximum magnification.

The above (A) is realized by the following procedure.

When an APS mode is selected, the original region detection process of FIG. 9 is carried out, followed by conversion of the original region with S(Sx, Sy)=(0, 0), T(Tx, Ty)=T(0, Ty), V(Vx, Xy)=(Vx, 0). Assuming that the original region is OWUX, the image reading process in an APS mode in a de-selection of a free original placement mode is carried out (FIGS. 11–13). It is to be noted that the position data S, T, U, and V of the original are stored to be used in the process of step S1102 (FIG. 13) in order to carry out an out-of-original erasure.

The above (B) is implemented by the following procedure.

When an AMS mode is selected, the original region detection process of FIG. 9 is carried out. Coordinates Px, Py on image memory 31 corresponding to the selected sheet are read out for conversion of the original region with T(Tx, Ty)=T(Tx, Py), V(Vx, Vy)=(Px, Vy), U(Ux, Uy)=U (Px, Py). This original region is assumed to be SYQZ. The coordinates (x, y) is converted into coordinates (x', y') with S as the origin according to the following equations 12a and 12b.

$$x'=x-Sx \quad (12a)$$

$$y'=y-Sy \quad (12b)$$

Figure 13:
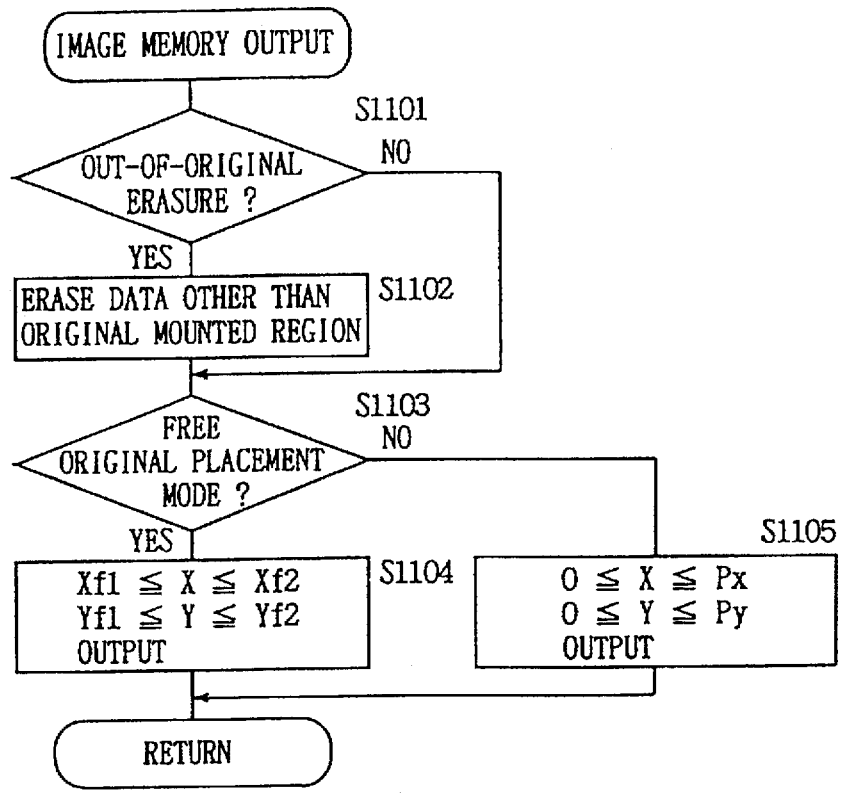
FIG. 13 is a flow chart showing an image memory output process.

Then, an image read process in an AMS mode at the deselection of a free original placement mode is carried out (FIGS. 11–13). It is necessary to store the original position data S, T, U, and V of the original which will be used in the process of step S1102 (FIG. 13) in order to carry out an out-of-original erasure.

Figure 18A:
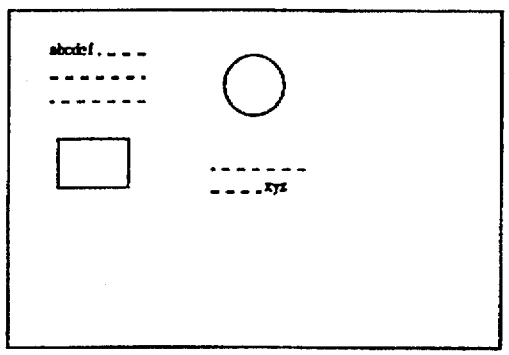
FIGS. 18a and 18b are diagrams for describing another embodiment under a de-select state of a free original placement mode.
Figure 18B:
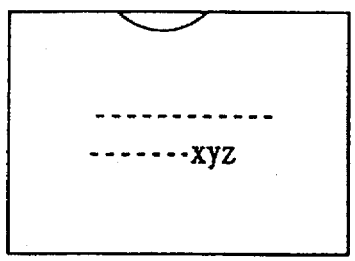

The results of the process by the controls of the above (A) (equal magnification) and (B) (selection of a sheet of A4 vertical) when original 55 is set as shown in FIG. 4a are indicated in FIGS. 18a and 18b. The above may be treated as another copy mode of a simple editorial mode which is selected via operation panel 90.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A digital copy machine comprising:
   an image reader for reading an image of an original sheet, mounted at a position on a platen, for each pixel of said image of said original sheet, and providing image data corresponding to a density of each said pixel;
   original region detection means for detecting said position of said original sheet on said platen according to said image data provided from said image reader;
   a first memory;
   writing means for writing said image data provided from said image reader into said first memory;
   reading means for reading image data from said first memory;
   image forming means for forming an image on a copy sheet according to image data read out by said reading means;
   magnification specifying means for specifying a copy magnification; and control means for controlling said writing means and said reading means according to said copy magnification specified by said magnification specifying means so that a center of said position of said original sheet on said platen, as detected by said original region detection means, is copied on a center of said copy sheet regardless of said copy magnification.

2. The digital copy machine according to claim 1, wherein said writing means writes image data in said first memory so that an address of the image data of the center of said position of said original sheet on said platen, as detected by said original region detection means, matches an address corresponding to the sheet center in said first memory.

3. The digital copy machine according to claim 1, further comprising:
    erasure means for erasing from said first memory image data corresponding to an area which is outside of said position of said original sheet on said platen, as detected by said original region detection means, according to a detection result of said original region detection means.

4. The digital copy machine according to claim 1, wherein said original region detection means comprises:
    skipping means for applying a skipping process on image data provided from said image reader, and
    a second memory for storing image data provided from said skipping means of an amount corresponding to an entire area of said platen,
    wherein said position of said original sheet on said platen is detected according to said image data stored in said second memory.

5. A digital copy machine comprising:
    an image reader for reading an image of an original sheet, mounted at a position on a platen, for each pixel of said image of said original sheet, and providing image data corresponding to a density of each said pixel;
    original region detection means for detecting said position of said original sheet on said platen according to said image data provided from said image reader;
    a memory;
    writing means for writing said image data provided from said image reader into said memory;
    reading means for reading image data from said memory;
    image forming means for forming an image on a copy sheet according to image data read out by said reading means;
    magnification specifying means for specifying a copy magnification;
    first selection means for selecting a free original placement mode controlling said writing means and said reading means according to a copy magnification specified by said magnification specifying means so that a center of said position of said original sheet on said platen, as detected by said original region detection means, is copied on a center of said copy sheet regardless of said copy magnification;
    sheet size specifying means for specifying a size of said copy sheet;
    second selection means for selecting a manual mode controlling said image forming means so that said image of said original sheet is copied at the copy magnification specified by said magnification specifying means and on a copy sheet of the size specified by said sheet size specifying means; and
    selection control means for inhibiting selection of said second selection means when said first selection means is selected.

6. The digital copy machine according to claim 5, further comprising:
    determination means for making a determination of an original sheet size according to a length and a width of said position of said original sheet on said platen, as detected by said original region detection means; and
    automatic paper selection means for automatically selecting an optimum copy sheet size according to said original sheet size, as determined by said determination means, and the copy magnification specified by said magnification specifying means.

7. The digital copy machine according to claim 5, further comprising:
    determination means for making a determination of an original sheet size according to a length and a width of said position of said original sheet on said platen, as detected by said original region detection means; and
    automatic magnification selection means for automatically selecting an optimum copy magnification according to the original sheet size determined by said determination means and the copy sheet size specified by said sheet size specifying means.

8. The digital copy machine according to claim 5, further comprising:
    determination means for making a determination of an original sheet size according to a length and a width of said position of said original sheet on said platen, as detected by said original region detection means;
    means for specifying an automatic paper selection mode to automatically select an optimum copy sheet size according to the original sheet size, as determined by said determination means, and the copy magnification specified by said magnification specifying means; and
    means for specifying an automatic magnification selection mode to automatically select an optimum copy magnification according to the original sheet size, as determined by said determination means, and the copy sheet size specified by said sheet size specifying means;
    wherein said second selection means selects one of said manual mode, said automatic paper selection mode, and said automatic magnification selection mode, and said selection control means allows selection of said automatic paper selection mode and said automatic magnification selection mode when said first selection means is selected.

9. A digital copy machine comprising:
    a platen having indices provided at a reference position and at positions remote from said reference position corresponding to sheet sizes in both a main scanning direction and a sub-scanning direction;
    an image reader for reading an image of an original sheet, mounted at a position on said platen, for each pixel of said image of said original sheet, and providing image data corresponding to a density of each pixel;
    original region detection means for detecting said position of said original sheet on said platen according to image data provided from said image reader;
    a memory;
    writing means for writing image data provided from said image reader into said memory;
    reading means for reading out image data from said memory;
    image forming means for forming an image on a copy sheet according to image data read out by said reading means;

sheet size specifying means for specifying a size of said copy sheet;

first memory control means for controlling said writing means and said reading means so that a portion of said image of said original sheet, which portion is located at a crossing of said indices corresponding to the size specified by said sheet size specifying means, is formed at a corner of said copy sheet of specified size; and means for erasing from the image data in said memory image data which corresponds to an area of said platen outside of the position of said original sheet on said platen, as detected by said original region detection means.

10. The digital copy machine according to claim 9, further comprising:

region size identifying means for identifying a size of a rectangular region having as two of its corners a corner of the original sheet mounted on said platen and the crossing of the indices corresponding to the size of copy sheet specified by said sheet size specifying means;

copy magnification specifying means for specifying a copy magnification corresponding to a ratio of the size of said rectangular region to said specified copy sheet size; and second memory control means for controlling said writing means and said reading means according to said copy magnification specified by said copy magnification specifying means.

11. A digital copy machine comprising:

a platen having indices provided at a reference position and at positions remote from said reference position corresponding to sheet sizes in both a main scanning direction and a sub-scanning direction;

an image reader for reading an image of an original sheet, mounted at a position on said platen, for each pixel of said image of said original sheet, and providing image data corresponding to a density of each pixel;

original region detection means for detecting said position of said original sheet on said platen according to image data provided from said image reader;

a memory for storing image data;

writing means for writing image data provided from said image reader into said memory;

reading means for reading image data from said memory;

image forming means for forming an image on a copy sheet according to image data read out by said reading means;

sheet size selection means for automatically selecting a copy sheet of optimum size according to a distance between said reference position and a corner of the original sheet which is most distant from said reference position on the basis of a detection result of said original region detection means;

memory control means for controlling said writing means and said reading means so that an image of the corner of the original sheet, which is most distant from said reference position, is image-formed at an edge of the copy sheet selected by said sheet size selection means; and means for erasing from said memory image data which corresponds to an area outside of said position of said original sheet on said platen, as detected by said original region detection means.

12. A digital copy machine comprising:

a platen;

a line sensor having a plurality of photoelectric conversion elements arranged in a main scanning direction;

scanning means for scanning an image of an original sheet, mounted at a position on said platen, in a sub-scanning direction perpendicular to said main scanning direction with respect to said line sensor;

first control means for controlling said scanning means so that said line sensor effects pre-scanning and main-scanning of an original sheet position on said platen;

a memory for storing image data outputted from said line sensor during pre-scanning;

original region detection means for detecting said position of said original sheet on said platen according to image data stored in said memory;

image forming means for forming an image on a copy sheet according to image data outputted from said line sensor in said main-scanning;

magnification specifying means for specifying a copy magnification; and second control means for controlling said image forming means according to the copy magnification specified by said magnification specifying means so that a center of said position of said original sheet on said platen, as detected by said original region detection means, is copied on a center of said copy sheet regardless of said copy magnification.

13. The digital copy machine according to claim 12, wherein said first control means controls said scanning means so that a speed of said line sensor in pre-scanning is faster than that in main-scanning.

14. The digital copy machine according to claim 12, wherein said original region detection means comprises:

address specifying means for specifying an address in said memory;

leading edge determination means for making a determination of whether image data of the address specified by said address specifying means is that at a leading edge of said original sheet; and first address control means for incrementing said address by one until the leading edge of said original sheet is detected by said leading edge determination means, and for incrementing said address by a first predetermined unit greater than one when the leading edge of said original sheet is detected by said leading edge determination means.

15. The digital copy machine according to claim 14, wherein said original region detection means comprises:

trailing edge determination means for making a determination of whether image data of an address specified by said address specifying means is that at a trailing edge of said original sheet; and second address control means for decrementing said address by a second predetermined unit, smaller than said first predetermined unit, when the trailing edge of said original sheet is detected by said trailing edge determination means, and for incrementing said address by one to detect the trailing edge of the original sheet by said trailing edge determination means.

16. The digital copy machine according to claim 14, wherein said leading edge determination means detects the leading edge of the original sheet by referring to image data of lines of a third predetermined unit including one line, in the main scanning direction, corresponding to an address specified by said address specifying means.

17. The digital copy machine according to claim 16, wherein said lines of said third predetermined unit corresponds to several millimeters on said original sheet.

18. The digital copy machine according to claim 13, further comprising:

first binarization means for binarizing image data outputted from said line sensor in said pre-scanning; and second binarization means for binarizing image data outputted from said line sensor in said main scanning;

wherein said first binarization means has a threshold value greater than that of said second binarization means.

19. A digital copy machine comprising:

a platen for mounting an original sheet;

a line sensor having a plurality of photoelectric conversion elements arranged in a main scanning direction;

scanning means for scanning an image of said original sheet in a forward movement and a backward movement in a sub-scanning direction perpendicular to said main scanning direction;

means for projecting an image scanned by said scanning means onto said line sensor;

skipping means for applying a skipping process on image data outputted from said line sensor in a forward movement of said scanning means;

a page memory for storing image data outputted from said skipping means of an amount corresponding to an entire area of said platen;

original region detection means for detecting an image of an original sheet, mounted at a position on said platen, according to image data stored in said page memory;

image forming means for forming an image on a copy sheet according to image data outputted from said line sensor in a backward movement of said scanning means;

magnification specifying means for specifying a copy magnification; and control means for controlling said image forming means according to said specified copy magnification so that a center of said position of said original sheet on said platen, as detected by said original region detection means, is copied on a center of the copy sheet regardless of said copy magnification.

20. The digital copy machine according to claim 19, wherein said scanning means has a scanning speed which is faster during said forward movement than during said backward movement.

21. A digital copy machine comprising:

a platen for mounting an original sheet;

an exposure lamp for exposing said original sheet, mounted at a position on said platen, to light from said exposure lamp;

a line sensor for receiving light reflected from said original sheet and for providing image data corresponding to said light reflected from said original sheet;

an optical system for projecting said light from said exposure lamp which has been reflected by said original sheet onto said line sensor;

scanning means for using light from said exposure lamp for scanning said original sheet in a forward movement and a backward movement;

original region detection means for detecting said position of said original sheet on said platen according to image data outputted from said line sensor in a formed movement of said scanning means;

image forming means for forming an image on a copy sheet according to image data outputted from said line sensor during a backward movement of said scanning means;

magnification specifying means for specifying a copy magnification;

control means for controlling said image forming means according to said specified copy magnification so that a center of said position of said original sheet on said platen, as detected by said original region detection means, is copied on a center of the copy sheet regardless of said copy magnification; and illuminating means for maintaining said exposure lamp at a turned on state from a start of a scan by said scanning means for said original region detection means to an end of a scan by said scanning means for said image forming means.

* * * * *